United States Patent Office 3,667,961
Patented June 6, 1972

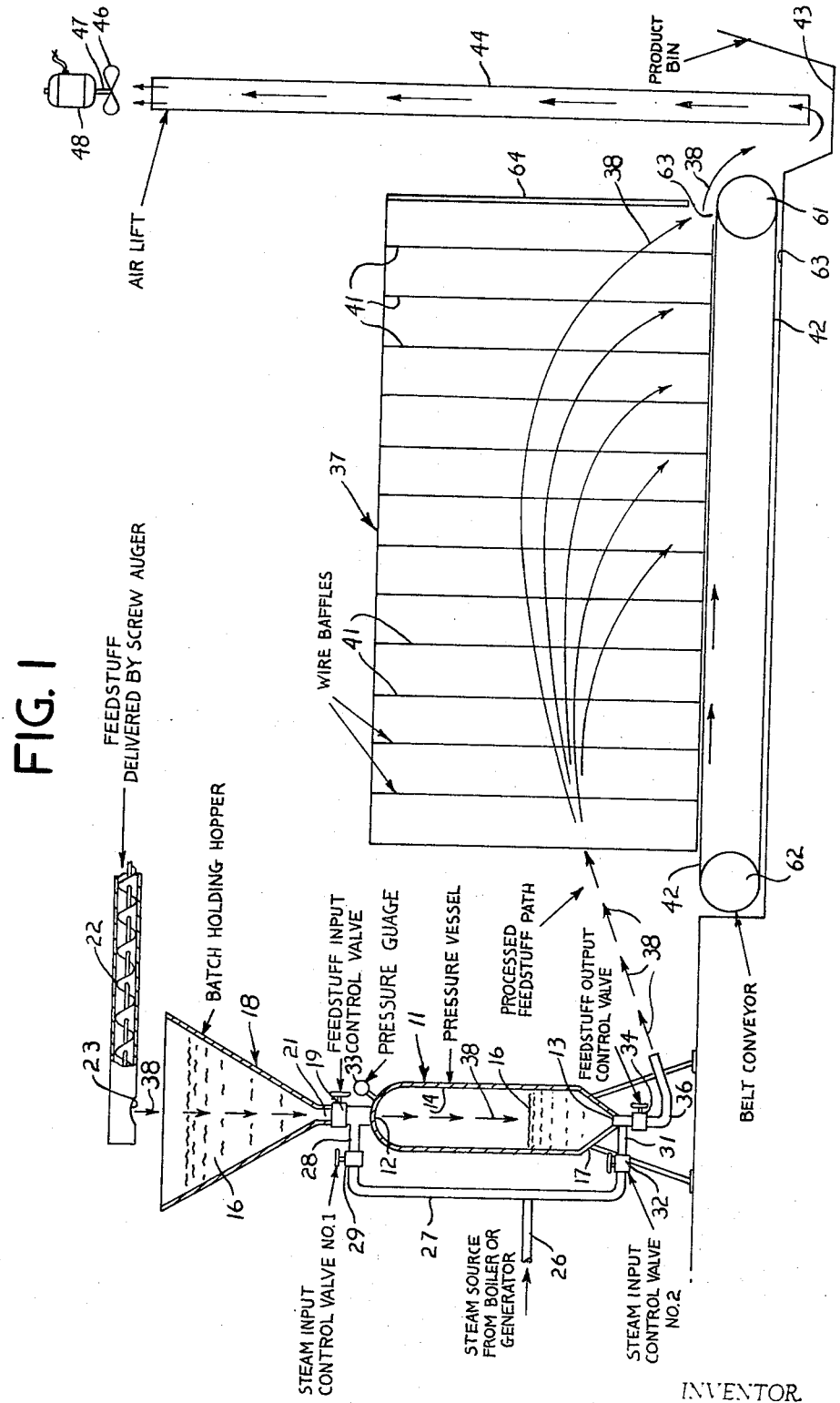

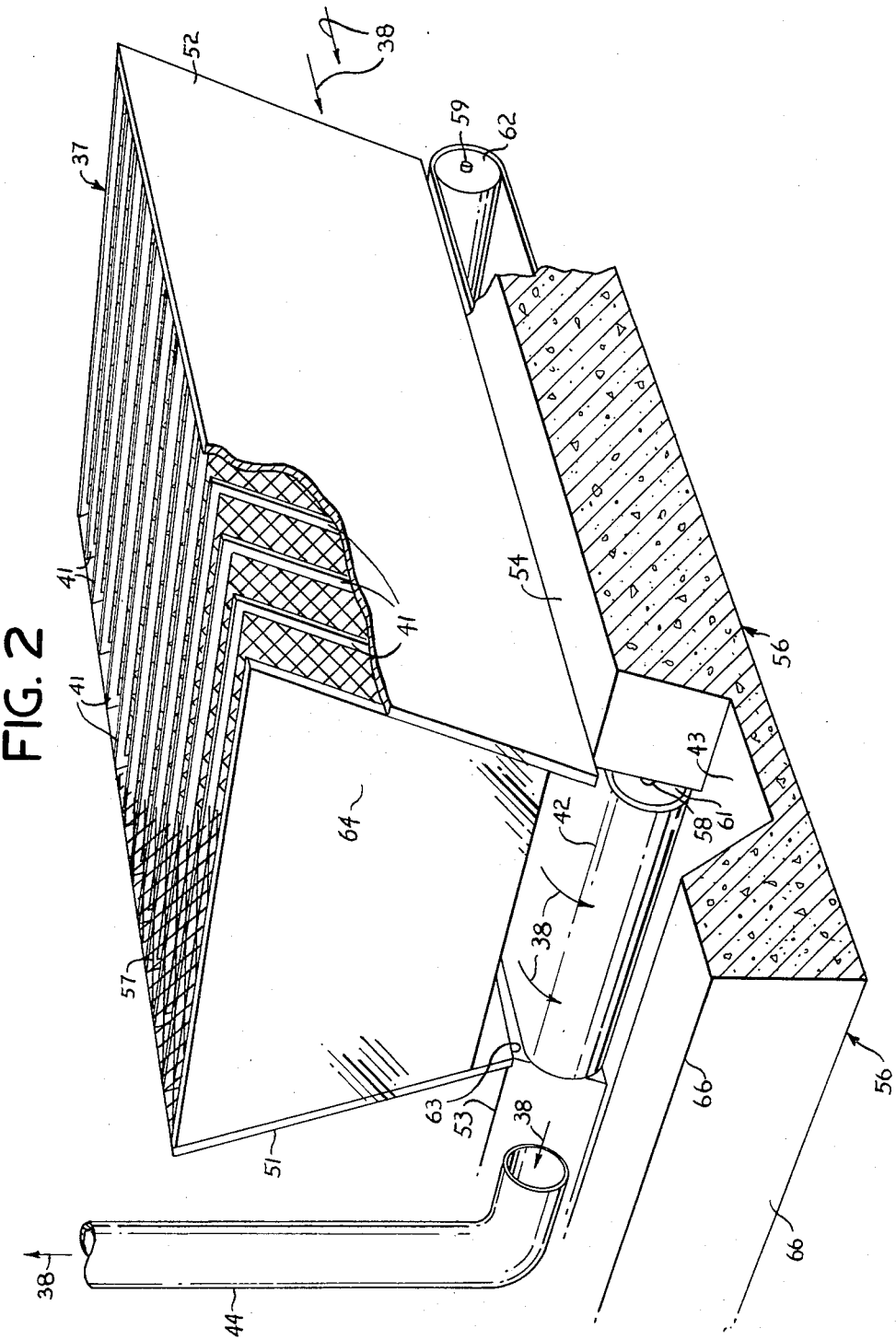

3,667,961
PROCESS FOR IMPROVING DIGESTIBILITY OF FEEDSTUFFS FOR RUMINANT ANIMALS
John W. Algeo, Santa Ynez, Calif., assignor to Santa Ynez Research Farm, Santa Ynez, Calif.
Filed Sept. 22, 1967, Ser. No. 674,050
Int. Cl. A23k 1/00
U.S. Cl. 99—2 R                          22 Claims

ABSTRACT OF THE DISCLOSURE

The invention comprises a rapid process and relatively economical equipment for increasing nutrient availability of ruminant animal feedstuffs, which includes the irreversible rearrangement of initial molecular bond structures of such feedstuffs to different molecular bond structures with concomitant degradation of relatively indigestible molecular structures to shorter chain length more digestible carbohydrates by subjecting ruminant animal feedstuffs in a closed vessel to high pressure steam for relative short time intervals and thereafter rapidly releasing the thus subjected feedstuffs to atmospheric conditions, together with means for successively collecting and storing the thus subjected feedstuffs, and which also includes reducing in the ingested resulting feedstuffs of the proportion of acetic acid in the rumen while increasing the total steam volatile fatty acid output by the rumen microflora.

---

The invention, in general, relates to the production of feedstuffs for ruminant animals, and more particularly relates to an improved method together with equipment for treating such feedstuffs to enhance digestibility and the availability of nutrients thereof.

It is perhaps well known that heretofore in the art the feed value of ruminant animal feedstuffs has been aided in a relatively small degree by steaming the feedstuffs at atmospheric pressure and passing it through flaking rolls. Another more recent method consists of pressure cooking the feedstuff at approximately 40 to 60 p.s.i., accompanied by flake rolling, to increase its value by enhancing digestibility thereof; such method being carried out only by continuous flow machines which are of complex construction and which require appreciable maintenance and are costly to operate. The foregoing methods of steam rolling have been restricted to cereal grains and, moreover, incompletely alter starch structures and nutrient availability. Further, retrogradation of starch has been found to take place after either at atmospheric pressure or steam cooking, if such are not followed by flaking, with the starch granules reverting to their crystalline less digestible state. Dry heat processing methods have also been tried but are not as successful as steam processing since dry heat at 180° to 220° C. produces pyrodextrins from starch which are relatively indigestible by animals. Also, acid hydrolysis processed with or without steaming has been proposed. However, such processes have many expensive steps which are slow and actually drastically over-process the grains and high protein feeds. The over-processing action of mineral acids such as phosphoric and sulfuric at high steam temperatures and pressures generally result in a much more complete oxidative breakdown toward carbon dioxide and water with a large concomitant loss of energy. Such a breakdown of high protein feedstuffs, additionally result in significant amino acid loss and ammonia release. Also excessive sugars can be formed in such processing which causes in ruminants not only diarrhea but also acidosis and other digestive disturbances. The present invention is directed to the provision of an improved process which obviates all of the disadvantages of prior methods and which is efficaceously applicable to the treatment of hitherto poorly digested materials as well as to the treatment of either single feedstuffs or of complex mixtures of feedstuffs in the form of complete rations.

Another important object of my invention is to provide an improved process of the indicated nature which is additionally characterized by stimulation of the production of increased total volatile fatty acids by the rumen microflora and an increase in propionic acid which concomitantly improves the efficiency of energy utilization.

A still further object of the invention is to provide an improved process of the aforementioned character which affords feedstuffs containing substantially reduced amounts of pesticides residues.

Another important object of my present invention is to provide improved feedstuffs for ruminant animals which are substantially free of viable noxious weed seeds.

Another object of the invention is to provide improved equipment for subjecting ruminant animal feedstuffs to high pressure steam under confined conditions and capable of effecting explosive release thereof to the atmosphere for collection and storage of sponge-like end products characterized by their capacity to take up water and digestive juices readily when ingested by a ruminant animal.

Other objects of the invention, together with some of the advantageous features thereof, will appear from the following description of a preferred mode of carrying out the invention and a preferred embodiment of the equipment employed as illustrated in the accompanying drawings. It is to be understood, however, that I am not to be limited to the precise mode of carrying out my invention as set forth, nor to the precise order of steps thereof, nor am I to be limited to the precise embodiment of the equipment shown nor to the precise arrangement of its components, as my invention, as defined in the appended claims, can be carried out in a plurality and variety of ways, and can be embodied in a plurality of forms.

Referring to the drawings:

FIG. 1 is a schematic view and flow sheet of a preferred mode of carrying out the invention; this view illustrating preferred embodiments of equipment employed in the process.

FIG. 2 is a perspective view of some of the components utilized in the preferred embodiment and mode of carrying out the improved process; this view illustrating the recovery equipment for the processed feedstuffs.

In its preferred mode, the improved process for improving digestibility of ruminant animal feedstuffs of my present invention preferably comprises introducing a desired charge of feedstuffs into a pressure vessel and sealing the vessel air-tight, then introducing high pressure steam into the vessel below the charge to saturate thoroughly all particles of the charge, thereafter introducing high pressure steam into the vessel above the charge while continuing the introduction of high pressure steam below the charge until a predetermined pressure within the vessel is attained, thereafter opening said vessel to the atmosphere and simultaneously ejecting the charge therefrom thereby to subject the charge of feedstuffs to an extreme pressure and temperature change with the molecular structure irreversibly altered, and finally collecting and drying the molecularly altered charge in bulky, sponge-like state.

In this process both the steaming of the feedstuffs at high temperature for a predetermined time interval and the explosive decompression instantaneously upon the expiration of such predetermined time interval are necessary to produce the final product of feedstuff with altered molecular structure. When the feedstuff under treatment is subjected to the high pressure steam alone, then hydration of the molecular bonds occur. However, on drying, the molecular structure retrogrades to its original state. When the softening of hydration is accompanied by rapid explosive release from confinement after expiration of a predetermined time interval through a small orifice into the atmosphere, then the physical structure and the molecular bonds are ruptured and retrogradation is prevented with the preservation of the shorter carbon chain length molecules, such as dextrins, in the final product which are more readily digested. In this process, the internal pressures in the feedstuffs are raised to equal the pressure developed in the area in which the processed feedstuff is confined. Upon instantaneous release from such high pressure confinement there is a violent rupturing of the physical structures present in the feedstuff as the high pressure steam contained therein expands. This action induces the permanent molecular changes producing the shorter carbon chain molecules and the light, bulky and sponge-like texture of the final product making it an ideal ruminant feed.

A preferred embodiment of equipment for practicing my aforesaid improved process preferably comprises an air-tight vessel into which a charge of ruminant animal feedstuffs has been disposed, means for forcing high pressure steam into said charge from below the same as well as from above the same to saturate thoroughly the particles of the charge and to subject the same to a predetermined high pressure for an interval of time, means for ejecting the subjected charge from said vessel under explosive force and high velocity into atmosphere conditions whereby the molecular structure of the charge of feedstuffs is irreversibly altered, and a collector and dryer disposed adjacent to the point of ejection for receiving the charge from said vessel; said collector and dryer comprising a series of screen baffles arranged in spaced relationship to one another, a moving endless conveyor movably mounted below said baffles for receiving and carrying away the particles of molecularly altered charge, and means for lifting the particles of the charge for transmittal to storage or distribution means.

In the annexed drawings I have illustrated means for practicing my improved process which are relatively inexpensive and which can be installed quickly and economically by individual owners of cattle ranches feed lots. As shown, the requisite equipment comprises a pressure vessel which is generally designated by the reference numeral 11 and which is preferably fabricated from a suitable metal such as steel, or a steel alloy or the like. The pressure vessel 11 is so formed as to provide an inlet 12 in the top thereof as well as a relatively small, narrow outlet 13 in the bottom thereof, and defines a relatively large chamber for the reception and retention of ruminant animal feedstuffs 16 which may be all of one substance or may be an admixture of a number of different feedstuffs. The pressure vessel 11 also is so formed adjacent the bottom thereof as to provide tapering walls, as at 17, which converge toward the outlet 13 in order to facilitate the flow of material from chamber 14 of the vessel through the narrow orifice 13 or outlet of the vessel. Associated with the vessel 11, and if desired forming an integral part thereof is a hopper 18 which conveniently is in the general form of an inverted cone defining a relatively wide mouth or inlet and a relatively small or narrow outlet; such hopper serving to receive and temporarily retain charges 16 of feedstuffs for delivery to the pressure vessel 11 by means of a valve controlled pipe 19 which establishes communication between the outlet 21 of the hopper and the chamber 14 of the vessel 11. The hopper 18 may be repetitively filled manually or may be filled with metered amounts of ruminant animal feedstuffs 16 delivered automatically from a standard screw conveyor 22 which is repetitively placed in motion under the control of a sensor, not shown, provided with a sensing actuator disposed at a predetermined level in the hopper and connected to a sensor switch which in turn is electrically connected to a motor, all not shown, for recurrently driving the screw conveyor 22 to feed additional amounts of feedstuffs to the hopper through the outlet 23 of the conveyor which is disposed in overlying relationship to the inlet of the hopper 18, as shown.

In accordance with my present invention, a source of steam, such as a boiler not shown, is provided for supplying steam under pressure to the pressure vessel 11 and a steam line or conduit 26 is connected between the outlet of the boiler and a steam head 27 which is formed with outlet lines at the top and bottom thereof. The top outlet line 28 from the steam head 27 is provided with a valve 29 and steam under pressure through valve-controlled line 28 is delivered to the chamber 14 of the pressure vessel onto the top of the charge 16 of feedstuffs disposed in the vessel. The bottom outlet line 31 from the steam head 27 is provided with a valve 32, and steam under pressure is delivered through such bottom steam line 31 into the chamber 14 of pressure vessel 11 to the bottom of the charge 16 of feedstuffs. Thus, with steam under pressure from below and steam under pressure from above, each charge 16 of feedstuffs is thoroughly saturated with steam and this is continued until the pressure within chamber 14 attains a predetermined pressure per square inch commensurate with the physical and chemical structure or structures of each particular charge 16 or admixtures of feedstuffs 16 that are disposed in the vessel 11 to be processed.

The pressure vessel 11 is equipped with a conventional pressure gauge 33 for ready visual observation at all times of the presusre build up within the chamber 14 with which the presure guage 33 is in communication. When the pressure within the chamber 14 has attained a predetermined pressure per square inch as applied to the steam saturated charge 16 of feedstuffs therein at the expiration of a time interval, as hereinafter explained for the different feedstuffs treated, a manually operated steam control valve 34 in an outlet line 36 for the feedstuffs 16 is opened to eject the feedstuffs under explosive force and velocity from the pressure vessel 11 through the terminal end of the outlet pipe 36 to atmospheric conditions. As indicated in FIG. 1 of the annexed drawings, I preferably dispose the outlet end of the feedstuffs outlet pipe 36 at an inclination to the horizontal to give the explosively released feedstuffs 16 a trajectory that will carry the same to combined drying and collecting equipment designated generally by the reference numeral 37, which is illustrated schematically in FIG. 1 and with more particularity in FIG. 2 of the annexed drawings. The path followed generally by the charges of feedstuffs 16 while being processed and advanced through the equipment is designated generally by the arrows 38 which indicate the delivery of the charges 16 initially into the hopper 18 and thence to the pressure vessel 11 and, after being subjected to high pressure steam for a predetermined time interval, thence through tilted outlet pipe 36 over to the combined dryer and collector 37 where the steam is dissipated and the particles of processed and molecularly altered feedstuffs are passed through a series of screen baffles 41 of the collector 37 and fall by gravity upon a moving take-off conveyor 42 which is movably mounted in underlying relationship to the feedstuffs dryer 37. The collected feedstuffs 16 in sponge-like form are carried by conveyor 42 into a bin 43 from which they are lifted, again as indicated by the arrows 38, by means of an air lift 44 operated by a driven fan 46 carried on motor shaft 47 of a motor 48 from which air lift the feedstuffs can be moved to storage or carried to mobile distribution units for transmission to troughs or other means available to the ruminant animals for feeding.

In accordance with my present invention, the combined dryer and collector 37 is placed in close proximity to the outlet end of tilted discharge pipe 36 and preferably is constructed in hopper-like form with downwardly converging sides 51 and 52 seated on spaced-apart sections 53 and 54, respectively, of a specially constructed base which is designated generally by the reference numeral 56 and which is preferably fabricated of concrete as indicated in FIG. 2 of the annexed drawings, in order to support the sides 51 and 52 and the series of screens 41 of the dryer and collector 37. The sections 53 and 54 of base 56 serve as bearings to journal the shafts 57 and 58 of drums 61 and 62 over which the endless conveyor belt 42 is trained. The baffles 41 as well as an overlying screen baffle 59 of the dryer and collector 37 can be removably mounted for purposes of removal and cleaning, using channels, not shown, in the sides of the dryer and collector 37 for the removable mounting of the screens 41 which are arranged COMPARATIVE EFFECTS ON MOLECULAR CHANGES RESULTING FROM VARIOUS GRAIN PROCESSING METHODS

CHART A

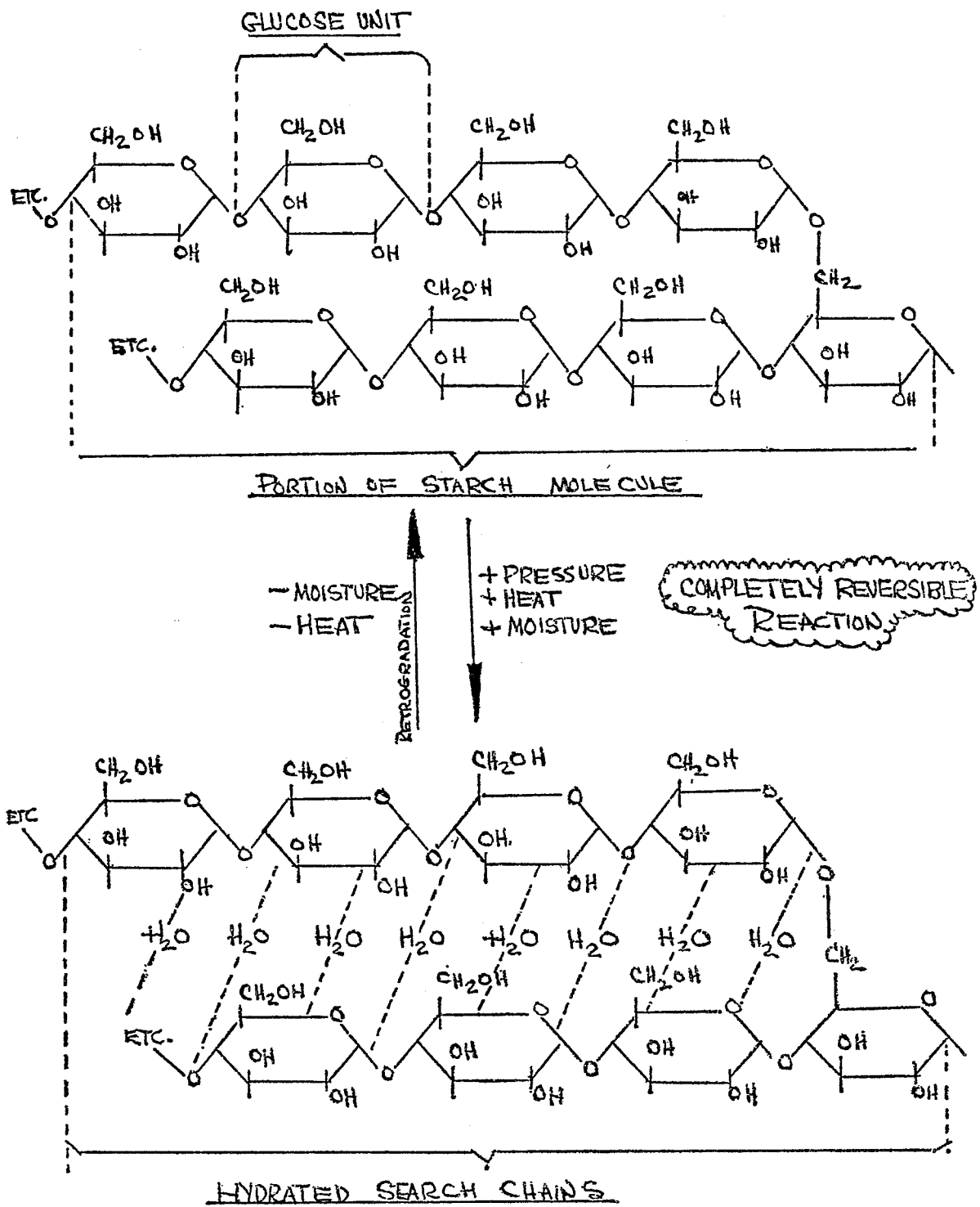

in aligned spaced relationship to one another. In this construction, the end of the dryer and collector 37 which is adjacent to the outlet end of pipe 36 is open for the passage of the processed feedstuffs 16 into the collector 37, and the bottom of the collector 37 likewise is open to permit gravity fall of the feedstuffs 16 onto the conveyor 42 which operates in the defined space 63 between the bottom of the collector 37 and the moving conveyor 42. An end panel 64 is provided on the collector 37 and terminated short of the space 63 so that feedstuffs 16 on the conveyor can pass thereon for discharge into the bin 43. As further shown in FIG. 2 of the accompanying drawings, the bin 43 can conveniently be formed in the base 56 by extending the side sections 53 and 54 thereof and by providing a joiner section 66 between such extended side sections.

The charts set out and designated by the reference characters A, B and C, show the results of subjecting corn or milo to dry heat or to low pressure cooking, as compared to the herein disclosed process of subjecting ruminant animal feedstuffs to high pressure steam followed by rapid release thereof to atmospheric conditions. It has heretofore been established as shown in Chart A, that retrogradation of starch can take place after cooking in that the starch granules are hydrated and gelatinized, and retrograde back to their crystalline, less digestible state. The use of dry heat will pop or explode grains but their feeding value may not necessarily be enhanced even though the grains pop or explode, since dry, high temperatures are conducive to molecular changes resulting in irreversible and undesirable bond formation reactions, or poorly digestible pyrodextrins, as shown in Chart B. In

CHART B

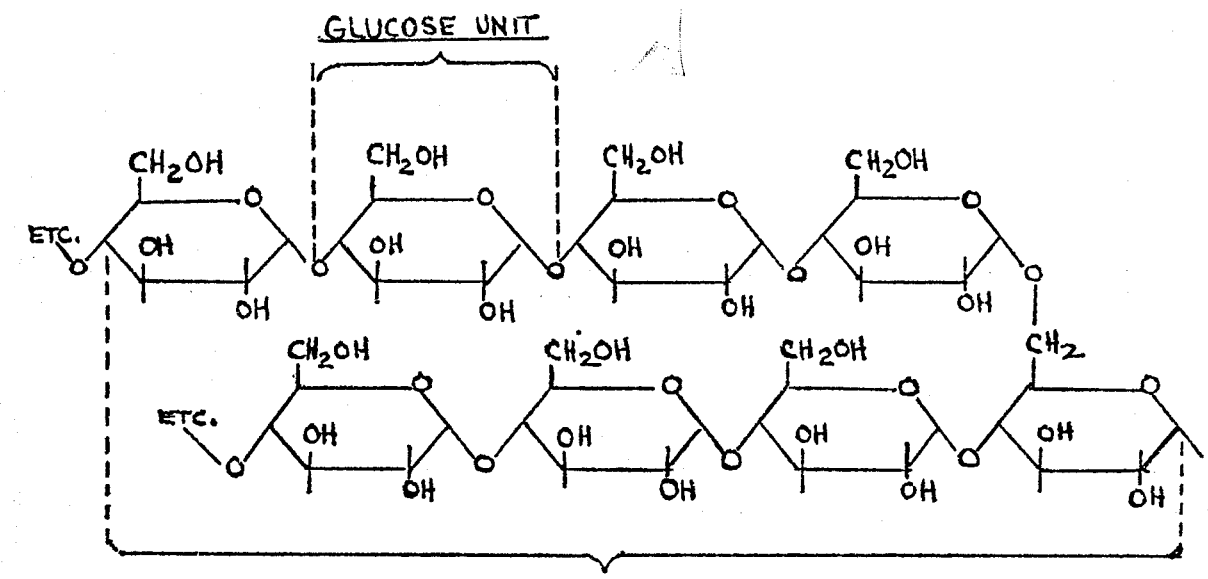

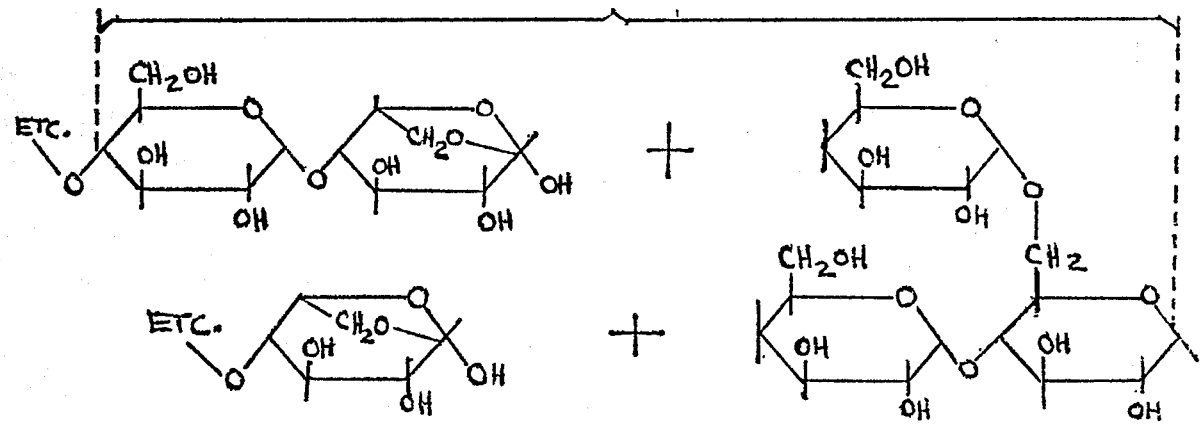

my improved process, retrogradation not only is prevented but the molecular bonds are re-arranged with concomitant degradation of complex relatively undigestible molecular structures to shorter chain length more digestible carbohydrates, as shown in Chart C. Thus, my improved process which induce the indicated beneficial chemical changes is unlike the popping of corn or milo by dry heat or low pressure cooking.

CHART C

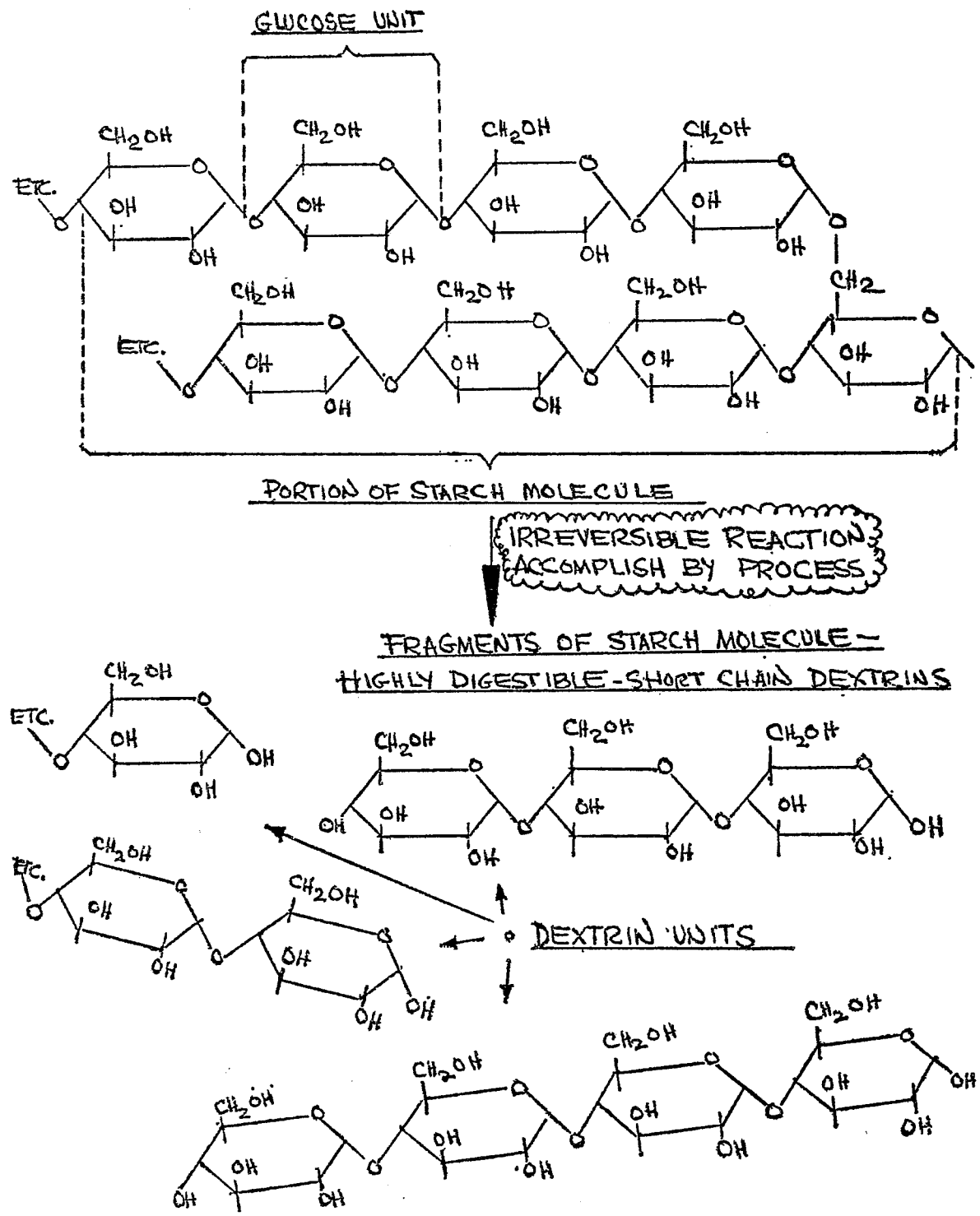

The following comparative tables, designated Table D and Table E, show the shifts in concentrations and shift percentages, respectively, of steam volatile fatty acids in the rumen, as a result of lowering the proportion of less desired acetic acid and increasing the proportions of the more beneficial propionic, butyric, iso-valeric and valeric acids upon digesting of milo grain treated in accordance with the steps of my improved process, indicated below as Proc. Milo, as compared to untreated Milo, indicated below as Untr. Milo:

TABLE D

Concentration of volatile fatty acids (moles/liter$\times 10^{-4}$)

| | Acetic acid | Propionic acid | Butyric acid | Iso-valeric acid | Valeric acid | Total |
|---|---|---|---|---|---|---|
| 4 hours in vitro incubation* | | | | | | |
| Untr. Milo | 949.3 | 264.7 | 190.6 | 24.8 | 16.5 | 1,445.9 |
| Proc. Milo | 1,083.0 | 421.7 | 238.7 | 31.4 | 25.4 | 1,800.2 |
| 6 hours in vitro incubation* | | | | | | |
| Untr. Milo | 1,063.7 | 301.2 | 224.6 | 25.9 | 18.6 | 1,634.0 |
| Proc. Milo | 1,166.2 | 488.9 | 276.1 | 31.4 | 27.5 | 1,990.1 |

*See footnote at end of table E.

TABLE E

| | Acetic acid | Propionic acid | Butyric acid | Iso-valeric acid | Valeric acid |
|---|---|---|---|---|---|
| Mole percent—4 hours in vitro incubation* | | | | | |
| Untr. Milo | 65.65 | 18.31 | 13.18 | 1.72 | 1.14 |
| Proc. Milo | 60.16 | 23.42 | 13.26 | 1.74 | 1.42 |
| Mole percent—6 hours in vitro incubation* | | | | | |
| Untr. Milo | 65.10 | 18.43 | 13.74 | 1.58 | 1.15 |
| Proc. Milo | 58.60 | 24.57 | 13.87 | 1.58 | 1.38 |

*This is a standard ruminant nutrition research technique in which a glass artificial rumen is innoculated with fresh rumen fluid containing micro-organisms from the rumen of a live bovine. The feeds to be studied are also introduced and the ensuing fermentation by the rumen micro-organisms can then be studied and measured.

Unlike conventional grain cooking or cooking and rolling processes heretofore practiced, complete rations for ruminant animals are successfully prepared by following the steps of the process herein set forth, except for the initial steps of selecting and admixing the appropriate ingredients of the feedstuffs. The explosive force generated by the release of the admixtures subjected as confined in the pressure vessel 11 to the relatively high temperatures and high steam pressures and thereafter released to the extremely lower atmospheric and ambient pressure and temperature, respectively, effectively breaks down the higher molecular weight carbohydrates typical of roughages present in the admixtures of the rations, thus enhancing the total diet than just the grain portion.

I have found that the pressures to be attained, and the time intervals for which the confined feedstuffs are to be subjected to in the pressure vessel by the high pressure steam, prior to release to atmospheric conditions are very critical for each commodity for optimum digestibility in the rumen and are approximately as indicated in Table F below for the indicated ruminant animal feedstuffs:

TABLE F

| Feedstuffs | Time (min.) | Pressure (p.s.i.) |
|---|---|---|
| Milo maize | 0.5-1.00 | 120-250 |
| Corn | 0.5-1.00 | 120-250 |
| Barley | 0.5-1.00 | 120-250 |
| Cull beans | 0.5-1.00 | 120-250 |
| Alfalfa seeds and screenings | 1.00-1.50 | 200-250 |
| Alfalfa hay | 1.00-1.50 | 400-500 |
| Alfalfa straw | 1.00-1.50 | 400-500 |
| Grain straws | 1.00-1.50 | 400-500 |
| Almond hulls | 0.50-0.75 | 150-190 |
| Almond shells | 3.00-4.00 | 600-700 |
| Coffee grounds | 4.00-5.00 | 900-1,000 |

From the foregoing examples in respect to the herein described process, it will be observed that the feedstuff or ration to be treated is introduced into pressure vessel 11 through input control valve 19, and steam under pressure from a steam generator or boiler is introduced rapidly to a desired level which is 120-250 p.s.i. for cereal grains and seeds and 500-1,000 p.s.i. for cellulosic feedstuffs such as all common roughages including hays, straws and the like, as well as for ligno cellulosic feedstuffs such as cottonseed hulls, rice hulls, nut shells or coffee grounds. After subjection to the high steam pressures and for the time intervals, as indicated in Table F, the feedstuff is explosively discharged from pressure vessel 11 through the small outlet orifice 13 which is approximately 10% to 15% of the inside diameter of the vessel; the explosive discharge consuming approximately 5-15 seconds, depending upon the amount of charge 16 disposed in the vessel 11 for treatment, and exerting such force as to create an irreversible molecular rearrangement within the feedstuff with concomitant degradation of complex, relatively indigestible molecular structures to shorter chain length more digestible carbohydrates, as clearly shown in Chart C, above. In actual practice, I have found it desirable for optimum results, first to open steam input valve 32, see FIG. 1, at the bottom of the pressure vessel 11 and admit high pressure steam into the vessel from the bottom of the disposed charge 16 of feedstuffs therein and cause the steam to move upwardly through the charge thus saturating all particles of the charge thoroughly with steam. Then, after 10 to 15 seconds, to open steam input valve 29 at the top of vessel 11 to admit high pressure steam through steam line 28 as well as leaving valve 32 open to continue to admit steam from the bottom along with admitted steam from the top until the desired pressure for the feedstuff under treatment is attained, as indicated by pressure gauge 33.

Moreover, in practicing the process in connection with relatively light loads approximating one-fourth to one-third of the volume of the pressure vessel and where no follow up steam from the steam lines 28 and 31 is required to assure complete evacuation of the treated feedstuff from the vessel, both steam input valve 29 and steam input valve 32 are closed when the indicated pressure for any given feedstuff in the vessel is attained. For heavier loads, approximating one-third—one-half of the volume of the vessel 11, the top steam input valve 29 is left open until after completion of evacuation or discharge of the treated feedstuff and after the output valve 34 has been closed.

It is to be understood that while I have illustrated and described the improved process of my present invention in respect to manual operation of the illustrated equipment and in connection with batch disposal of feedstuffs 16 in the vessel 11, the process can be conducted and sequenced automatically with standard electronic devices now in use in th feeding industry, depending upon the requirements of a given feed manufacturing plant.

In order to avoid spoilage and additional expense for drying end products of my improved process, which are light and fluffy, the exploded charges 16 are exhausted to the hopper-like collector and dryer 37, see especially FIG. 2 of the annexed drawings, which prevents moisture condensation and concomitant possible spoilage, as well as allows complete dissipation of steam through the mesh to or wire screen 57; the individual screen baffles 41 of such collector and dryer 37 slowing down the velocity of the otherwise fast moving exploded charges 16 naturally to cause the particles to drop by force of gravity onto the live conveyor 42 for subsequent transfer by air lift 44 or other means to storage or distribution. The handling advantages of the end products of my improved process over the handling of conventional steam rolled feedstuffs is tremendous in view of the bulky sponge-like end products exploded from the pressure vessel 11, such fluffy sponge-like end products additionally being characterized by their ability to take up readily water upon ingestion by the ruminant animal. This latter fact allows the digestive juices and bacterial enzymes to enter the structure of the feedstuff and to thus gain intimate contact with the substrates to be acted upon. Such intimate contact is essential for enzymes and digestive juices in order effectively to break down their substrates into available nutrients.

Moreover, my improved process additionally is advantageous in respect to the destruction of noxious weed seeds in the feedstuffs, by reason of the high temperature, high pressure and high explosive forces generated upon the rapid discharge of the confined feedstuff to the atmosphere, thus yielding a feedstuff free from weed seeds such as Johnson grass, Bermuda grass and the like. In turn, this weed-free end product produces feed lot manure which is more readily saleable in that it passes state and local weed control as well as horticultural rules, regulations and laws.

In addition, since the temperatures attained within the pressure vessel 11 in respect to grain feedstuffs approximate 350° F. to 400° F., and in respect to roughage approximate 470° F. to 546° F., pesticide residues which may be present on the feedstuffs 16 are effectively volatilized and destroyed. This reduction in otherwise possibly harmful pesticides by the use of my process facilitates the safe use of previously quarantined or condemned feedstuffs in livestock feeding.

I claim:

1. A process for improving the in vivo digestibility and nutritional value of (a) ruminant animal feedstuff consisting of feed grains containing undigestible carbohydrates; said process irreversibly altering the molecular bonds and physical structure of the grains of said feed grains to more digestible shorter carbon chain molecules and more digestible dextrins and sugars without the formation of poorly digestible pyrodextrins and comprising the step of subjecting an amount of said feed grains under confinement in a volume of large cross sectional area of a given size to saturation with steam under pressure ranging between 120–250 pounds p.s.i. for a time interval ranging between 0.5 to 1.0 minute at temperatures ranging between 350° F. and 400° F., followed by the step of simultaneously explosively releasing said feed grains under pressure from confinement in said large area through a restriction of relatively smaller cross-sectional area than the cross-section of confinement with the expiration of said time interval into an unconfined area at ambient pressure and temperature.

2. The process set forth in claim 1 wherein the feedstuff consists of a quantity of a single feed grain selected from the class of feed grains which include barley, milo maize, beans and corn and wherein the temperature of the steam ranges between 350° F. and 400° F. and the pressure of the steam ranges between 120 pounds p.s.i. and 250 pounds p.s.i. and the time interval that the single feed grain is under confinement ranges between 0.5 of a minute to 1.0 minute.

3. A process as set forth in claim 2 wherein the molecular structure of the single feed grain during pressurization remains constant and the confined feedstuff is hydrated, and wherein the molecular structure of the hydrated feedstuff is irrevocably altered from a dense physical form to a sponge-like physical structure and the molecular structure is irreversibly changed from a complex higher molecular weight carbohydrate to a short chain-length highly digestible carbohydrate upon the violent explosive ejection thereof from pressurized confinement.

4. A process as set forth in claim 1 wherein the feedstuff consists of a quantity of a mixture of at least two feed grains selected from the class including milo maize, barley, and corn which is subjected under confinement to saturation with steam under pressure ranging between approximately 120 and 250 pounds per square inch for a time interval of approximately one-half minute to a minute at a temperature ranging between 350° F. and 400° F. prior to the simultaneous release thereof from confinement to ambient pressure upon the expiration of said time interval.

5. A process as set forth in claim 2 except that the ruminant animal feedstuff processed comprises a quantity of an admixture of at least two of said feed grains selected from said class of field grains.

6. A new product for feeding ruminant animals prepared by the process of claim 1.

7. A new product as set forth in claim 6, wherein the shorter chain length carbohydrates of the irreversible molecular structure enhance the volatile fatty acid synthesis by the rumen microflora of the ruminant animal to increase the total food energy available for the animal's use.

8. A new product as set forth in claim 7 wherein the enhanced fatty acid synthesis of the rumen microflora of the ruminant animal upon the irreversible molecular structure of short chain length carbohydrates, and dextrins, and sugars contained in said feedstuff compound induces a shift in the molecular percentage of volatile fatty acids to a lower percentage of less desirable acetic acid and to a higher percentage of desirable propionic acid thereby enhancing the amount of available energy for the animal.

9. A new product for ruminant animals as defined in claim 6, which is characterized by its ability to take up water readily when ingested thereby allowing digestive juices and bacterial enzymes to enter the structure of the feedstuff and gain intimate contact with and to break down substrates of the digestive juices and bacterial enzymes into available nutrients.

10. A process for improving the in vivo digestibility and nutritional value of ruminant animal cellulosic feed stuff containing undigestible carbohydrates and selected from the class including alfalfa hay, alfalfa straw and grain straws; said process irreversibly altering the molecular bonds and physical structure of said feedstuffs to more digestible shorter carbon chain molecules and more digestible dextrins and sugars without the formation of poorly digestible pyrodextrins and comprising the step of subjecting an amount of said feedstuff under confinement in a volume of larger cross-sectional area of a given size to saturation with steam under pressure ranging between 400–500 pounds p.s.i. for a time interval ranging between 1.00 and 1.50 minutes at temperatures ranging between approximately 470° F. to 546° F., followed by the step of simultaneously explosively releasing said feedstuff from confinement in said large area through a restriction of relatively smaller cross-sectional area than the cross-sectional area of confinement upon the expiration of said time interval into an unconfined area at ambient pressure and temperature.

11. A process as set forth in claim 10, except that the feedstuff is ligno-cellulosic, wherein an amount of almond hulls is subjected under confinement to steam under pressure ranging from approximately 150 to 190 pounds per square inch for a time interval of from one-half to three-quarters of a minute at a temperature ranging between 470° F. to 546° F.

12. A process as set forth in claim 10, except that the feedstuff is ligno-cellulosic, wherein a quantity of almond shells is subjected under confinement to steam under pressure ranging from approximately 600 to 700 pounds per square inch for a time interval of approximately three to four minutes at a temperature ranging between 470° F. to 546° F.

13. A process as set forth in claim 10, except that the feedstuff is ligno-cellulosic, wherein a quantity of coffee grounds is subjected under confinement to steam under pressure ranging from approximately 900 to 1000 pounds per square inch for a time interval of approximately four to five minutes at a temperature ranging between 470° F. to 546° F.

14. A process as set forth in claim 10, wherein said feedstuff comprises an admixture of alfalfa straw and grain straws.

15. A process as set forth in claim 14 wherein alfalfa hay is included in said admixture.

16. A process for improving the in vivo digestibility and nutritional value of ruminant animal feedstuff consisting of a quantity of a cellulosic ruminant animal feedstuff selected from the class of cellulosic substances including alfalfa hay, alfalfa straw and grain straws containing undigestible carbohydrates; said process irreversibly altering the molecular bonds and physical structure of the cellulosic substance to more digestible shorter carbon chain length molecules and more digestible dextrins and sugars without the formation of poorly digestible pyrodextrins and comprising the step of subjecting a quantity of said cellulosic substance under confinement in a volume of large cross-sectional area of a given size to saturation with steam under pressure ranging between 400–500 pounds p.s.i. for a time interval ranging between 1.00 and 1.50 minutes at temperatures ranging between 470° F. and 546° F., followed by the step of simultaneously explosively releasing said cellulosic substance under pressure from confinement in said large area through a restriction of relatively smaller cross-sectional area than the cross-section of confinement with the expiration of said time interval into an unconfined area at ambient pressure and temperature.

17. A process as set forth in claim 16 except that the ruminant animal cellulosic feedstuff processed comprises a quantity of an admixture of at least two substances selected from said class of said cellulosic substances.

18. A process for improving the in vivo digestibility and nutritional value of ruminant animal feedstuff consisting of a quantity of a substance of the class of ligno-cellulosic ruminant animal feedstuffs including cottonseed hulls, rice hulls, nut shells and coffee grounds containing undigestible carbohydrates; said process irreversibly altering the molecular bonds and physical structure of the ligno-cellulosic substance to more digestible shorter carbon chain length molecules and more digestible dextrins and sugars without the formation of poorly digestible pyrodextrins and comprising the step of subjecting a quantity of said ligno-cellulosic substance under confinement in a volume of large cross-sectional area of a given size to saturation with steam under pressure ranging between 150 and 1000 p.s.i. for a time interval ranging between 0.50 and 5.00 minutes at temperature ranging between 470° F. and 546° F., followed by the step of simultaneously explosively releasing said ligno-cellulosic substance under pressure from confinement in said large area through a restriction of relatively smaller cross-sectional area than the cross-section of confinement with the expiration of said time interval into an unconfined area at ambient pressure and temperature.

19. A process as set forth in claim 18 except that the ruminant animal ligno-cellulosic feedstuff comprises a quantity of an admixture of at least two of said substances selected from said class of said ligno-cellulosic feedstuffs.

20. A process of stimulating the microbial fermentative output of the rumen microflora of a ruminant animal and increasing the total steam volatile fatty acid output of the rumen microflora and reducing the percentage of lower energy acetic acid and concomitantly increasing the percent of higher energy propionic, butyric, valeric and isovaleric acids, said process comprising feeding to a ruminant animal a quantity of a feedstuff prepared by the process comprising the step of subjecting an amount of feed grains under confinement in a volume of large cross-sectional area of a given size to saturation with steam under pressure ranging between 120–250 pounds p.s.i. for a time interval ranging between 0.5 to 1.0 minute at temperature ranging between 350° F. and 400° F., followed by the step of simultaneously explosively releasing said feed grains under pressure from confinement in said large area through a restriction of relatively smaller cross-sectional area than the cross-section of confinement with the expiration of said time interval into an unconfined area at ambient pressure and temperature.

21. A process as set forth in claim 20 wherein said feedstuff comprises a product of the process set forth in claim 15 and wherein initial feedstuff processed consisted of a quantity of a single feed grain selected from the class which includes barley, wheat, milo maize, beans and corn.

22. A process as set forth in claim 20, wherein the fed irreversibly altered feedstuff affects the microfloral metabolism of ruminant animals to such an extent that said feedstuff is penetrated by digestive fluids of the ruminant animal containing rumen microorganisms and enzymes thereby enhancing nutrient availability and stimulating animal performance by increasing rumen microfloral fermentation.

References Cited

UNITED STATES PATENTS

| | | | |
|---|---|---|---|
| 537,570 | 4/1895 | Fyfe | 99—8 |
| 3,212,932 | 10/1965 | Hess et al. | 127—37 |
| 1,035,835 | 8/1912 | Anderson | 99—82 |
| 1,395,015 | 10/1921 | Rowell | 99—82 |
| 2,279,280 | 4/1942 | Musher | 99—82 |
| 2,653,093 | 9/1953 | Baer | 99—82 |
| 3,314,797 | 4/1967 | Hess et al. | 99—2 |

FOREIGN PATENTS 541,960   12/1941   Great Britain.

OTHER REFERENCES

Kirk-Othmer: Encyclopedia of Chemical Technology, 2nd Edition, volume 18, 1969, p. 682.

NORMAN YUDKOFF, Primary Examiner

C. P. RIBANDO, Assistant Examiner

U.S. Cl. X.R.

127—37; 99—82, 10